(12) United States Patent
Tseng

(10) Patent No.: US 8,921,965 B2
(45) Date of Patent: Dec. 30, 2014

(54) OPTICAL COMMUNICATION DEVICE

(71) Applicant: Hon Hai Precision Industry Co., Ltd., New Taipei (TW)

(72) Inventor: Kuo-Fong Tseng, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 14/035,965

(22) Filed: Sep. 25, 2013

(65) Prior Publication Data
US 2014/0339662 A1 Nov. 20, 2014

(30) Foreign Application Priority Data

May 15, 2013 (TW) ............................. 102117292 A

(51) Int. Cl.
*H01L 27/14* (2006.01)
*H01L 31/0232* (2014.01)
*H01L 31/16* (2006.01)

(52) U.S. Cl.
CPC ............ *H01L 31/0232* (2013.01); *H01L 31/16* (2013.01)
USPC ........................................ 257/432

(58) Field of Classification Search
CPC ................................. H01L 27/14; H01L 31/00
USPC ........................................................ 257/432
See application file for complete search history.

(56) References Cited

U.S. PATENT DOCUMENTS

2006/0039658 A1* 2/2006 Furuyama et al. .............. 385/90
2006/0215969 A1* 9/2006 Hamasaki et al. .............. 385/89

* cited by examiner

*Primary Examiner* — Marc Armand
(74) *Attorney, Agent, or Firm* — Novak Druce Connolly Bove + Quigg LLP

(57) ABSTRACT

An optical communication device includes a planar optical waveguide, a substrate and an optical-electric element. The planar optical waveguide includes a first side surface and a light guide portion formed in the planar optical waveguide. The substrate includes a first sidewall and a second sidewall facing away from the first sidewall. The first sidewall is substantially parallel with the second sidewall. The substrate defines a light guide hole running through both the first sidewall and the second sidewall. The first sidewall is connected to the first side surface, with the light guide hole aligning with the light guide portion. The optical-electric element includes an optical surface. The optical-electric element is assembled to the second sidewall, with the optical surface aligning with the light guide hole and the light guide portion.

20 Claims, 1 Drawing Sheet

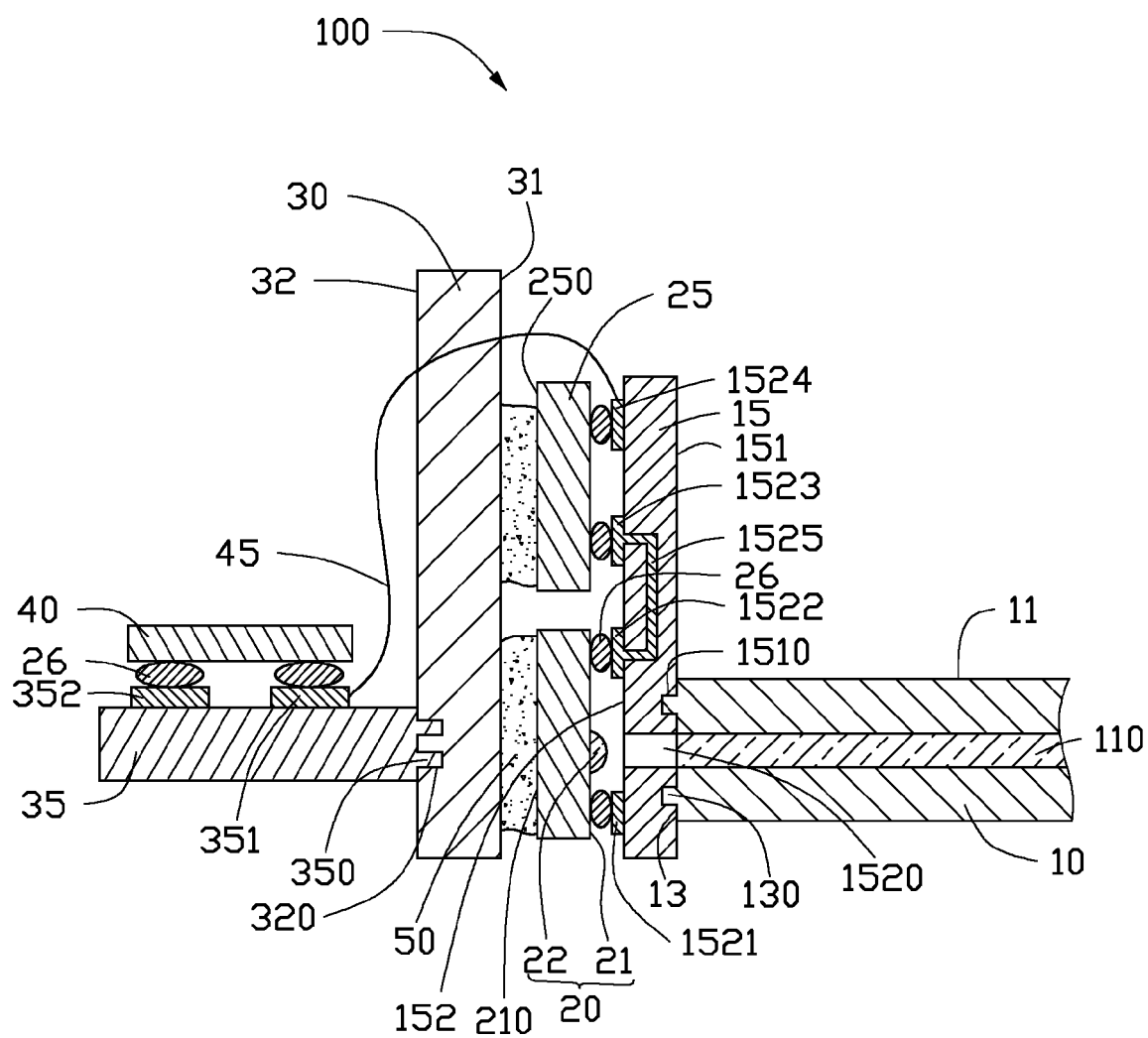

OPTICAL COMMUNICATION DEVICE

BACKGROUND

1. Technical Field

The present disclosure relates to an optical communication device.

2. Description of Related Art

An optical communication device includes a substrate, at least one photoelectric element positioned on the substrate for emitting/receiving electrical signals, and a light waveguide transmitting optical signals. The photoelectric element emits/receives optical signals with a transmitting direction substantially perpendicular to the substrate, and a transmitting direction of optical signals in the light waveguide is substantially parallel to the substrate. Therefore, a transmitting direction of optical signals should be deflected for substantially 90 degrees to optically couple the photoelectric element with the light waveguide. In the current optical communication device, a complex coupler is adapted to deflect a transmitting direction of optical signal for 90 degrees for optically coupling the photoelectric element with the light waveguide. However, the coupler increases an assembling difficulty and cost of the optical communication device.

Therefore, it is desirable to provide an optical communication device that can overcome the above-mentioned limitations.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

The FIGURE is a schematic view of an optical communication device, according to an exemplary embodiment of the present disclosure.

DETAILED DESCRIPTION

The FIGURE shows an optical communication device 100, according to an exemplary embodiment. The optical communication device 100 includes a planar optical waveguide 10, a first substrate 15, an optical-electric element 20, a first controller 25, a heat dissipating plate 30, a second substrate 35, and a processor 40.

The planar optical waveguide 10 includes a top surface 11, a first side surface 13, and a light guide portion 110 formed in the planar optical waveguide 10. The first side surface 13 is substantially perpendicular to the top surface 11. A lengthwise direction of the light guide portion 110 is substantially parallel with the top surface 11. The planar optical waveguide 10 also includes two first locating posts 130 substantially perpendicularly extending from the first side surface 13. In the embodiment, the two first locating posts 130 are symmetrical about the light guide portion 110.

The first substrate 15 is made of copper to improve heat dissipating efficiency. The first substrate 15 includes a first sidewall 151 and a second sidewall 152 facing away from the first sidewall 151. The first sidewall 151 is substantially parallel with the second sidewall 152. Both the first sidewall 151 and the second sidewall 152 are substantially perpendicular to the lengthwise direction of the light guide portion 110. Both the first sidewall 151 and the second sidewall 152 are substantially perpendicular to the top surface 11. The first sidewall 151 defines two first locating holes 1510 spatially corresponding to the two first locating posts 130, and a light guide hole 1520 running though the first sidewall 151 and the second sidewall 152. In the embodiment, the two first locating holes 1510 are symmetrical about the light guide hole 1520. The light guide hole 1520 spatially corresponds to the light guide portion 110. In assembly, each first locating post 130 is received by a first locating hole 1510 to assemble the first substrate 15 onto the first side surface 13 of the planar optical waveguide 10, with the light guide hole 1520 aligning with the light guide portion 110.

It should be noted that, in another embodiment, the first substrate 15 can also be assembled to the planar optical waveguide 10 by adhesive, plastic welding, or other attaching methods.

The first substrate 15 includes a first connection pad 1521, a second connection pad 1522, a third connection pad 1523, and a fourth connection pad 1524. The first connection pad 1521, the second connection pad 1522, the third connection pad 1523, and the fourth connection pad 1524 all are formed on the second sidewall 152. The second connection pad 1522 is nearby the third connection pad 1523 and the first connection pad 1521. Both the second connection pad 1522 and the third connection pad 1523 are located between the first connection pad 1521 and the fourth connection pad 1524.

The first substrate 15 also includes a connection portion 1525 buried in the first substrate 15. The first substrate 15 is made of a conductive element. One end of the connection portion 1525 is connected to the second connection pad 1522. The other end of the connection portion 1525 is connected to the third connection pad 1523. As such, the second connection pad 1522 is electrically connected to the third connection pad 1523.

In the embodiment, the optical-electric element 20 is a laser diode. The optical-electric element 20 includes an optical surface 21, a first connection surface 210 facing away from the optical surface 21, and a light condensing lens 22 formed on the optical surface 21. In the embodiment, the optical surface 21 is substantially parallel with the first connection surface 210, the light condensing lens 22 is a convex lens. The optical-electric element 20 is supported on and electrically connected to the first connection pad 1521 and the second connection pad 1522 through two pad balls 26, with the light condensing lens 22 aligning with the light guide hole 1520 and the light guide portion 110.

The first controller 25 is supported on and electrically connected to the third connection pad 1523 and the fourth connection pad 1523 also through two pad balls 26. As such, the first controller 25 is electrically connected to the optical-electric element 20 through the second connection pad 1522, the connection portion 1525, and the third connection pad 1523. The first controller 25 includes a second connection surface 250.

The optical communication device 100 includes a heat dissipating adhesive 50. In the embodiment, the heat dissipating adhesive 65 is a silver adhesive. The heat dissipating adhesive 50 is coated on the first connection surface 210 and the second connection surface 250.

The heat dissipating plate 30 is connected to the optical-electric element 20 and the first controller 25. The heat dissipating plate 30 includes a first surface 31 and a second surface 32 facing away from the second surface 31. The first surface 31 is substantially parallel with the second surface 32. Both the first surface 31 and the second surface 32 are also substantially perpendicular to the top surface 11. The first surface 31 is connected to the first connection surface 210 and the second connection surface 250 by the heat dissipating adhesive 50. The second surface 32 defines two second locating holes 320.

The second substrate 35 is made of a material such as polyimide, ceramic, or glass fiber. The second substrate 35 includes two second locating posts 350 substantially perpendicularly extending from a side surface of the second substrate 35. The two second locating posts 350 spatially correspond to the second locating holes 320. In assembly, each second locating post 350 is received by a second locating hole 320 to assemble the second substrate 35 to the second surface 32 of the heat dissipating plate 30. The second substrate 35 also includes a fifth connection pad 351 and a six connection pad 352.

It should be noted that, in another embodiment, the second substrate 35 can also be assembled to the second surface 32 of the heat dissipating plate 30 by adhesive, plastic welding, or other attaching methods.

The processor 40 is supported on and electrically connected to the fifth connection pad 351 and the sixth connection pad 352 also through two pad balls 26. The fifth connection pad 351 is also electrically connected to the fourth connection pad 1524 through a connection line 45. As such, the processor 40 is electrically connected to the first controller 25 through the fourth connection pad 1524, the fifth connection pad 351, and the connection line 45.

In use, the processor 40 sends a trigger signal to the first controller 25. The first controller 25 receives the trigger signal and generates a driving signal to drive the optical-electric element 20 to emit light beams. The light beams emitted by the optical-electric element 20 are condensed by the light condensing lens 22 and are directed into the light guide portion 110 of the planar optical waveguide 10. As such, the light beams are finally transmitted into another optical communication device (not shown) by the planar optical waveguide 10. The heat dissipating plate 30 is capable of dissipating heat generated by the optical-electric element 20, the processor 40, the second substrate 35, and the first substrate 25.

The optical communication device 100 employs the first substrate 15 perpendicularly connected to the planar optical waveguide 10, the optical-electric element 20 is connected to the first substrate 15 with the optical surface 21 facing the second sidewall 152, and the planar optical waveguide 10 is positioned substantially perpendicular to the first substrate 15, with the light guide portion 110 aligning with the optical surface 21. Therefore, optical signals can be transmitted between the light guide portion 110 and the optical-electric element 20 along a linear direction, it is no need to bend the light guide portion 110 or adapt a coupler to deflect optical signals. Accordingly, an assembling difficulty and cost of the optical communication device are decreased.

In other embodiments, the light condensing lens 22 can be omitted if the light is not required to be condensed.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. An optical communication device, comprising:
a planar optical waveguide comprising a first side surface and a light guide portion formed in the planar optical waveguide, the planar optical waveguide comprising two first locating posts substantially perpendicularly extending from the first side surface;
a first substrate comprising a first sidewall and a second sidewall facing away from the first sidewall, the first sidewall substantially parallel with the second sidewall, both the first sidewall and the second sidewall substantially perpendicular to a lengthwise direction of the light guide portion, the first sidewall defining two first locating holes spatially corresponding to the two first locating posts, each first locating post is received by a respective one of the first locating holes to assemble the first substrate onto the first side surface, the first substrate defining a light guide hole running through both the first sidewall and the second sidewall, the first sidewall connected to the first side surface, with the light guide hole aligning with the light guide portion; and
an optical-electric element comprising an optical surface, the optical-electric element assembled to the second sidewall, with the optical surface aligning with the light guide hole and the light guide portion.

2. The optical communication device of claim 1, wherein the two first locating posts are symmetrical about the light guide portion, the two first locating holes are symmetrical about the light guide hole.

3. The optical communication device of claim 1, wherein the first substrate comprises a first connection pad and a second connection pad, both the first connection pad and the second connection pad are formed on the second sidewall, the optical-electric element is supported on and electrically connected to the first connection pad and the second connection pad.

4. The optical communication device of claim 1, wherein the optical-electric element is a laser diode.

5. The optical communication device of claim 1, wherein the optical-electric element comprises a light condensing lens formed on the optical surface, the light condensing lens aligns with the light guide hole and the light guide portion.

6. The optical communication device of claim 1, wherein the first substrate is made of copper.

7. The optical communication device of claim 1, wherein the planar optical waveguide comprises a top surface substantially perpendicular to the first side surface, a lengthwise direction of the light guide portion is substantially parallel with the top surface.

8. The optical communication device of claim 3, comprising two pad balls, wherein the optical-electric element is supported on and electrically connected to the first connection pad and the second connection pad through the two pad balls.

9. The optical communication device of claim 3, comprising a first controller, wherein the first substrate further comprises a third connection pad, a fourth connection pad, and a connection portion buried in the first substrate, the third connection pad and the fourth connection pad are formed on the second sidewall, the connection portion is electrically connected the second connection pad to the third connection pad, the first controller is supported on and electrically connected to the third connection pad and the fourth connection pad.

10. The optical communication device of claim 5, wherein the light condensing lens is a convex lens.

11. The optical communication device of claim 9, comprising another two pad balls, wherein the first controller is supported on and electrically connected to the third connection pad and the fourth connection pad through the another two pad balls.

12. The optical communication device of claim 9, wherein the second connection pad is nearby the third connection pad and the first connection pad, both the second connection pad and the third connection pad are located between the first connection pad and the fourth connection pad.

13. The optical communication device of claim 9, comprising a heat dissipating plate and a heat dissipating adhesive, wherein the heat dissipating plate comprises a first surface and a second surface facing away from the second surface, the optical-electric element comprises a first connection surface facing away from the optical surface, the first controller comprises a second connection surface, the first surface is connected to the first connection surface and the second connection surface with the heat dissipating adhesive.

14. The optical communication device of claim 13, wherein the heat dissipating adhesive is a silver adhesive.

15. The optical communication device of claim 13, comprising a second substrate, wherein the second surface defines two second locating holes, the second substrate comprises two second locating posts substantially perpendicularly extended from a side surface of the second substrate, the two second locating posts spatially correspond to the second locating holes, each second locating post is received by a respective one of the second locating holes to assemble the second substrate to the second surface of the heat dissipating plate.

16. The optical communication device of claim 15, comprising a processor and a connection line, wherein the second substrate comprises a fifth connection pad and a six connection pad, the processor is supported on and electrically connected to the fifth connection pad and the sixth connection pad, the fifth connection pad is also electrically connected to the fourth connection pad through the connection line.

17. An optical communication device, comprising:
a planar optical waveguide comprising a first side surface and a light guide portion formed in the planar optical waveguide, the planar optical waveguide comprising two first locating posts substantially perpendicularly extending from the first side surface;
a first substrate, the first substrate is made of copper and comprising a first sidewall and a second sidewall facing away from the first sidewall, the first sidewall being substantially parallel with the second sidewall, both the first sidewall and the second sidewall being substantially perpendicular to a lengthwise direction of the light guide portion, the first sidewall defining two first locating holes spatially corresponding to the two first locating posts, each first locating post is received by a respective one of the first locating holes to assemble the first substrate onto the first side surface, the first substrate defining a light guide hole running through both the first sidewall and the second sidewall, the first sidewall being connected to the first side surface, with the light guide hole aligning with the light guide portion, the first substrate further comprising a first connection pad and a second connection pad, both the first connection pad and the second connection pad are formed on the second sidewall, and;
an optical-electric element and two pad balls, the optical-electric element comprising an optical surface and a light condensing lens formed on the optical surface, the two pad balls formed on the optical surface and beside the light condensing lens, the two pad balls corresponding to the first connection pad and the second connection pad respectively, the optical-electric element is assembled toward the second sidewall and electrically connected to the first connection pad and the second connection pad through the two pad balls, and the light condensing lens aligning with the light guide hole and the light guide portion.

18. The optical communication device of claim 17, wherein the two first locating posts are symmetrical about the light guide portion, the two first locating holes are symmetrical about the light guide hole.

19. The optical communication device of claim 17, comprising a first controller, wherein the first substrate further comprises a third connection pad, a fourth connection pad, and a connection portion buried in the first substrate, the third connection pad and the fourth connection pad are formed on the second sidewall, the connection portion is electrically connected the second connection pad to the third connection pad, the first controller is supported on and electrically connected to the third connection pad and the fourth connection pad.

20. The optical communication device of claim 19, comprising a heat dissipating plate and a heat dissipating adhesive, wherein the heat dissipating plate comprises a first surface and a second surface facing away from the second surface, the optical-electric element comprises a first connection surface facing away from the optical surface, the first controller comprises a second connection surface, the first surface is connected to the first connection surface and the second connection surface with the heat dissipating adhesive.

* * * * *